United States Patent
Jang et al.

(10) Patent No.: US 11,455,288 B2
(45) Date of Patent: Sep. 27, 2022

(54) VERSION TABLE SCHEME FOR FAST VERSION SPACE ACCESS

(71) Applicant: SAP SE, Walldorf (DE)

(72) Inventors: Ji Hoon Jang, Seongnam-si (KR); Hyeong Seog Kim, Seoul (KR); Yong Sik Kwon, Seoul (KR)

(73) Assignee: SAP SE, Walldorf (DE)

( * ) Notice: Subject to any disclaimer, the term of this patent is extended or adjusted under 35 U.S.C. 154(b) by 179 days.

(21) Appl. No.: 16/824,853

(22) Filed: Mar. 20, 2020

(65) Prior Publication Data
US 2021/0294785 A1 Sep. 23, 2021

(51) Int. Cl.
*G06F 16/00* (2019.01)
*G06F 16/23* (2019.01)

(52) U.S. Cl.
CPC ...... *G06F 16/2329* (2019.01); *G06F 16/2322* (2019.01); *G06F 16/2365* (2019.01)

(58) Field of Classification Search
CPC ............. G06F 16/2365; G06F 16/2329; G06F 16/2322
See application file for complete search history.

(56) References Cited

U.S. PATENT DOCUMENTS

| | | | |
|---|---|---|---|
| 7,251,669 B1* | 7/2007 | Arora | G06F 16/2329 707/695 |
| 2004/0034616 A1* | 2/2004 | Witkowski | G06F 16/283 |
| 2004/0249838 A1* | 12/2004 | Hinshaw | G06F 16/2329 |
| 2005/0033720 A1* | 2/2005 | Verma | G06F 16/2379 |
| 2009/0271435 A1* | 10/2009 | Yako | G06F 16/2343 |
| 2011/0246503 A1* | 10/2011 | Bender | G06F 16/258 707/769 |
| 2015/0178329 A1* | 6/2015 | Andrei | G06F 16/2365 707/609 |
| 2015/0261805 A1* | 9/2015 | Lee | G06F 16/2365 707/703 |
| 2018/0089266 A1* | 3/2018 | Vujic | G06F 16/24537 |
| 2018/0150360 A1* | 5/2018 | Kwon | G06F 11/2097 |
| 2019/0179805 A1* | 6/2019 | Prahlad | G06F 16/1827 |

* cited by examiner

*Primary Examiner* — Shiow-Jy Fan
(74) *Attorney, Agent, or Firm* — Fish & Richardson P.C.

(57) ABSTRACT

Methods, systems, and computer-readable storage media for determining that a first transaction results in a first version of data stored in a page in a database system, the first version being stored in a version space and the data being stored in a table space, in response to the first version, providing a version table for the page, the version table including a set of cells each cell corresponding to a record in the page, setting a version table pointer of the page to point to the version table, and setting a version pointer of a first cell to point to the first version in the version space, the first cell corresponding to a record of the data in the page.

20 Claims, 5 Drawing Sheets

VERSION TABLE SCHEME FOR FAST VERSION SPACE ACCESS

BACKGROUND

A database system can include a table space and a version space. Each space can be considered a memory space, in which data is stored. In some examples, the table space store data of one or more tables, and the version space stores changes to data (e.g., versions of data) in response to one or more transactions being executed on the data. Data and/or a version of the data is committed to memory at a so-called commit timestamp (CTS). In some examples, a reader of data from the database system can read data from the database system based on a CTS of the data. Reading of the appropriate data is coordinated through the version space scheme.

A traditional version space scheme uses a hash table to find relevant versions of record from the version space. In such a version space scheme, a record identifier (physical location of record) is used as hash key and the hash table returned the address of the latest version created on the record. However, version space schemes that use hash tables have several drawbacks.

For example, because of the potential for hash collisions, the search time of the hash table increases as the number of records having versions increases (i.e., as the number of entries in the hash table increases). Further, if a new entry is inserted or an existing entry is removed from the hash table, a mutually exclusive (mutex) is applied, which significantly degrades scalability. Also, the memory consumption (also referred to as memory footprint) of a hash table is relatively larger (even when there are few entries) as compared with other data structures (e.g., containers). This is because a relatively large array is pre-allocated for hash buckets. In database systems, the number of hash buckets is usually very large (e.g., larger than 1 million) to reduce hash collisions. Consequently, even the initial memory footprint is also very large.

SUMMARY

Implementations of the present disclosure are directed to a version table scheme to improve speed in version space access. More particularly, implementations of the present disclosure are directed to selectively providing version tables that enable access to versions of data within a version space using multiple indirections provided using pointer lookups.

In some implementations, actions include determining that a first transaction results in a first version of data stored in a page in a database system, the first version being stored in a version space and the data being stored in a table space, in response to the first version, providing a version table for the page, the version table including a set of cells each cell corresponding to a record in the page, setting a version table pointer of the page to point to the version table, and setting a version pointer of a first cell to point to the first version in the version space, the first cell corresponding to a record of the data in the page. Other implementations of this aspect include corresponding systems, apparatus, and computer programs, configured to perform the actions of the methods, encoded on computer storage devices.

These and other implementations can each optionally include one or more of the following features: prior to determining that a transaction results in a first version of data stored in a page, the version table pointer comprises a null pointer; a version pointer of a second cell in the set of cells includes a null pointer; actions further include determining that a second transaction results in a second version of the data stored in the page, the second version being stored in the version space, and in response to the second version: changing the version pointer of the first cell to point to the second version in the version space, and providing a previous version pointer of the second version to point to the first version within the version space; a number of cells in the set of cells is equal to a number of records in the page; actions further include deleting the version table in response to execution of a version garbage collection process; and actions further include receiving a read request for a record in the page, the read request including a snapshot timestamp, and determining that a version flag of the record is set to a value indicating that at least one version of data of the record is stored in the version space, and in response, accessing a version of the data based on the STS and one or more commit timestamps (CTSs).

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

Like reference symbols in the various drawings indicate like elements.

DETAILED DESCRIPTION

Implementations of the present disclosure are directed to a version table scheme to improve speed in version space access. More particularly, implementations of the present disclosure are directed to selectively providing version tables that enable access to versions of data within a version space using multiple indirections provided using pointer lookups. Implementations can include actions of determining that a first transaction results in a first version of data stored in a page in a database system, the first version being stored in a version space and the data being stored in a table space, in response to the first version, providing a version table for the page, the version table including a set of cells each cell corresponding to a record in the page, setting a version table pointer of the page to point to the version table, and setting a version pointer of a first cell to point to the first version in the version space, the first cell corresponding to a record of the data in the page.

Implementations of the present disclosure are described in further detail with reference to an example database system. The example database system is provided as the SAP HANA in-memory database system provided by SAP SE of Walldorf, Germany. SAP HANA can be described as a data platform that processes transactions and analytics at the same time on any data type, with built-in advanced analytics and multi-model data processing engines. More particularly, SAP HANA is an in-memory database system. In some examples, an in-memory database system can be described as a database system that uses main memory for data storage. In some examples, main memory includes random access memory (RAM) that communicates with one or more processors (e.g., central processing units (CPUs)), over a memory bus. An-memory database can be contrasted with database management systems that employ a disk storage mechanism. In some examples, in-memory databases are faster than disk storage databases, because internal optimization algorithms can be simpler and execute fewer CPU instructions (e.g., require reduced CPU consumption). In some examples, accessing data in an in-memory database eliminates seek time when querying the data, which provides faster and more predictable performance than disk-storage databases. While SAP HANA is used as an example herein, it is contemplated, however, that implementations of the present disclosure can be realized in any appropriate database system.

Figure 1:
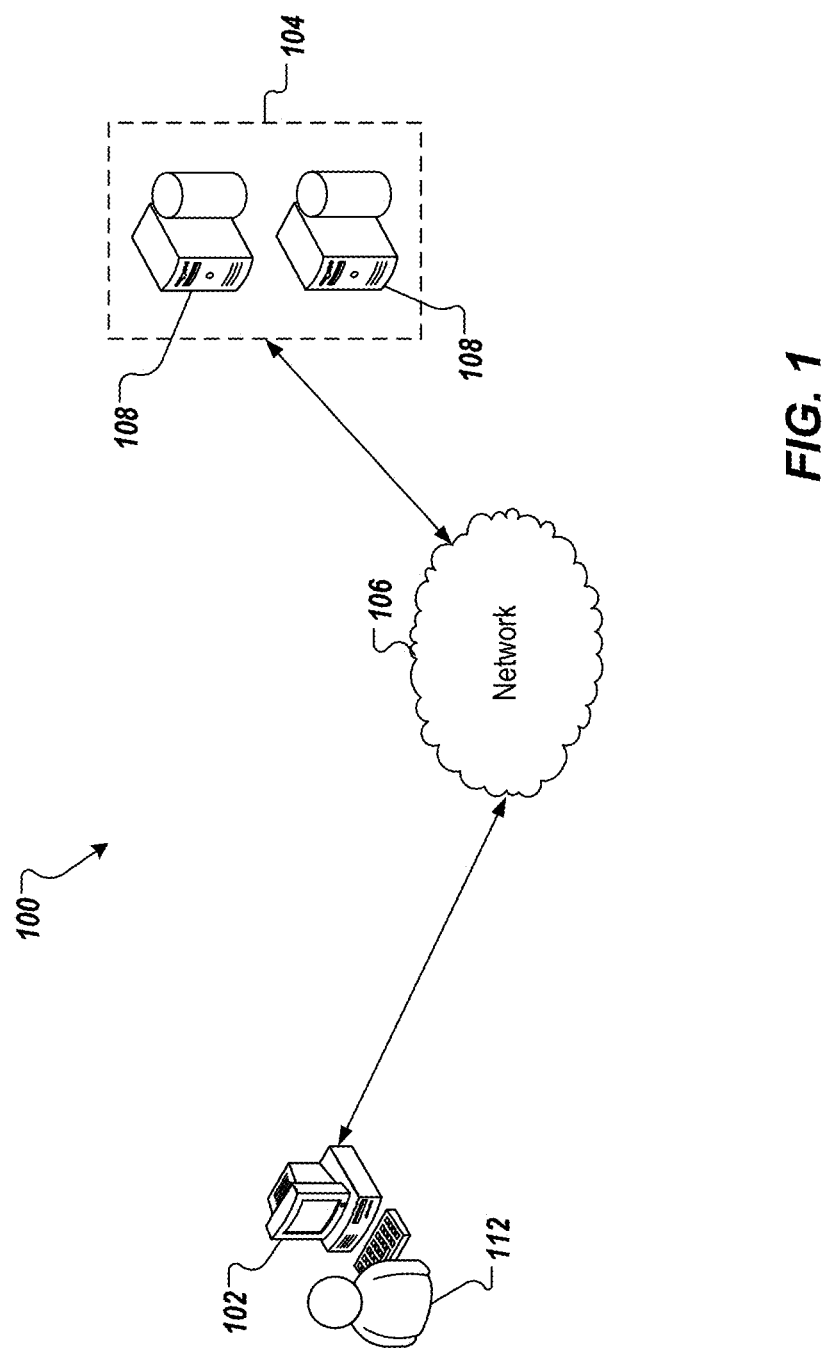
FIG. 1 depicts an example architecture that can be used to execute implementations of the present disclosure.

FIG. 1 depicts an example architecture 100 in accordance with implementations of the present disclosure. In the depicted example, the example architecture 100 includes a client device 102, a network 106, and a server system 104. The server system 104 includes one or more server devices and databases 108 (e.g., processors, memory). In the depicted example, a user 112 interacts with the client device 102.

In some examples, the client device 102 can communicate with the server system 104 over the network 106. In some examples, the client device 102 includes any appropriate type of computing device such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices. In some implementations, the network 106 can include a large computer network, such as a local area network (LAN), a wide area network (WAN), the Internet, a cellular network, a telephone network (e.g., PSTN) or an appropriate combination thereof connecting any number of communication devices, mobile computing devices, fixed computing devices and server systems.

In some implementations, the server system 104 includes at least one server and at least one data store. In the example of FIG. 1, the server system 104 is intended to represent various forms of servers including, but not limited to a web server, an application server, a proxy server, a network server, and/or a server pool. In general, server systems accept requests for application services and provides such services to any number of client devices (e.g., the client device 102 over the network 106).

In accordance with implementations of the present disclosure, and as noted above, the server system 104 can host an in-memory database system (e.g., SAP HANA). Access to versions of data stored within a version space the database system can be managed using the version table scheme of the present disclosure, as described in further detail herein.

To provide further context for implementations of the present disclosure, and as introduced above, a database system can include a table space and a version space.

Each space can be considered a memory space, in which data is stored. In some examples, the table space store data of one or more tables, and the version space stores changes to data (e.g., versions of data) in response to one or more transactions being executed on the data. Data and/or a version of the data is committed to memory at a so-called commit timestamp (CTS). In some examples, a reader of data from the database system can read data from the database system based on a CTS of the data, as described in further detail by way of non-limiting example below.

In some database systems, a memory management scheme is provided that includes a data space divided between a metadata space, a user data space, and an undefined data space. Each data space includes a set of segments (e.g., metadata segments, user data segments, and undefined data segments, respectively). Each set of segments includes one or more segments, each segment including a set of pages. Each set of pages includes one or more pages. Each page includes a set of slots. Each set of slots includes one or more slots, each slot storing data. The slots are the basic unit for operation of the database system.

In the non-limiting example, a table (MYTAB) can be created in the database system and data can be stored in the table. For example, the following example transactions (statements) can be executed:
CREATE TABLE MYTAB (COL CHAR(10));
INSERT INTO MYTAB VALUES ('A');
COMMIT;
In response to execution of the above example statements, the table is created and data is inserted into a row of the table (e.g., at CTS=1). In some examples, the data is stored in memory within a slot of a page of a segment within the table space (e.g., user data space).

After being initially stored in the table space, a transaction can be executed that can affect the data. For example, and continuing with the non-limiting example above, the following example transactions (e.g., statements) can be executed:
UPDATE MYTAB SET COL='B';
COMMIT;
In response to execution of the above example statements, the data in the row of the table is changed (from A to B) and the change is committed (e.g., at CTS=3). This results in a first version of the data. That is, and in this example, the data B is a first version of the original data A. The first version is stored in a version space (e.g., another user data space)

and is reference by the original version through a version space scheme, discussed in further detail herein.

Continuing with the non-limiting example, the following example transactions (e.g., statements) can be executed:
UPDATE MYTAB SET COL='C';
COMMIT;
In response to execution of the above example statements, the data in the row of the table is changed (from B to C) and the change is committed (e.g., at CTS=5). This results in a second version of the data. That is, and in this example, the data C is a second version of the original data A. The second version is stored in the version space and is referenced by the original version through the version space scheme. In some examples, the second version (e.g., later version) references the first version (e.g., earlier version) through the version space scheme.

Continuing with the non-limiting example, the following example transactions (e.g., statements) can be executed:
UPDATE MYTAB SET COL='D';
COMMIT;
In response to execution of the above example statements, the data in the row of the table is changed (from C to D) and the change is committed (e.g., at CTS=7). This results in a third version of the data. That is, and in this example, the data D is a third version of the original data A. The third version is stored in the version space and is referenced by the original version through the version space scheme. In some examples, the third version (e.g., the latest version) references the second version (e.g., the next latest version), which references the first version (e.g., earliest version) through the version space scheme.

As introduced above, a reader (e.g., a transaction requesting data to be read from a table) reads data based on a snapshot timestamp (STS) and the CTSs of the original data and any version. For example, in response to a read request, the data returned is based on comparing the STS and the CTS(s), such that the value of the data corresponds to the original or version based on the CTS(s) that the STS is greater than or less than. Using the non-limiting example provided above, a reader whose STS is less than 3 will read A, a reader whose STS is less than 5 and greater than or equal to 3 will read B, a reader whose STS is less than 7 and greater than or equal to 5 will read C, and a reader whose STS is greater than or equal to 7 will read D. Reading of the appropriate data is coordinated through the version space scheme.

In further detail, the version space scheme specifies how the database system stores versions and what information each version contains. In so-called time-travel storage, versions created on the same data (record) are linked in the order of commit timestamp. This is represented in the non-limiting example above, in which the latest (newest) version is placed at the front. In this manner, if the latest version of a certain record is found in the version space, any other versions created on the record can be found through link traversal. In some examples, versions in the version space are consolidated into the table space by a garbage collection process when the record image stored in the table space is no longer necessary.

A traditional version space scheme uses a hash table to find relevant versions of record from the version space. In such a version space scheme, a record identifier (physical location of record) is used as hash key and the hash table returned the address of the latest version created on the record. In some examples, a record identifier uniquely identifies a slot within a page within a segment, within which the record is stored.

Figure 2:
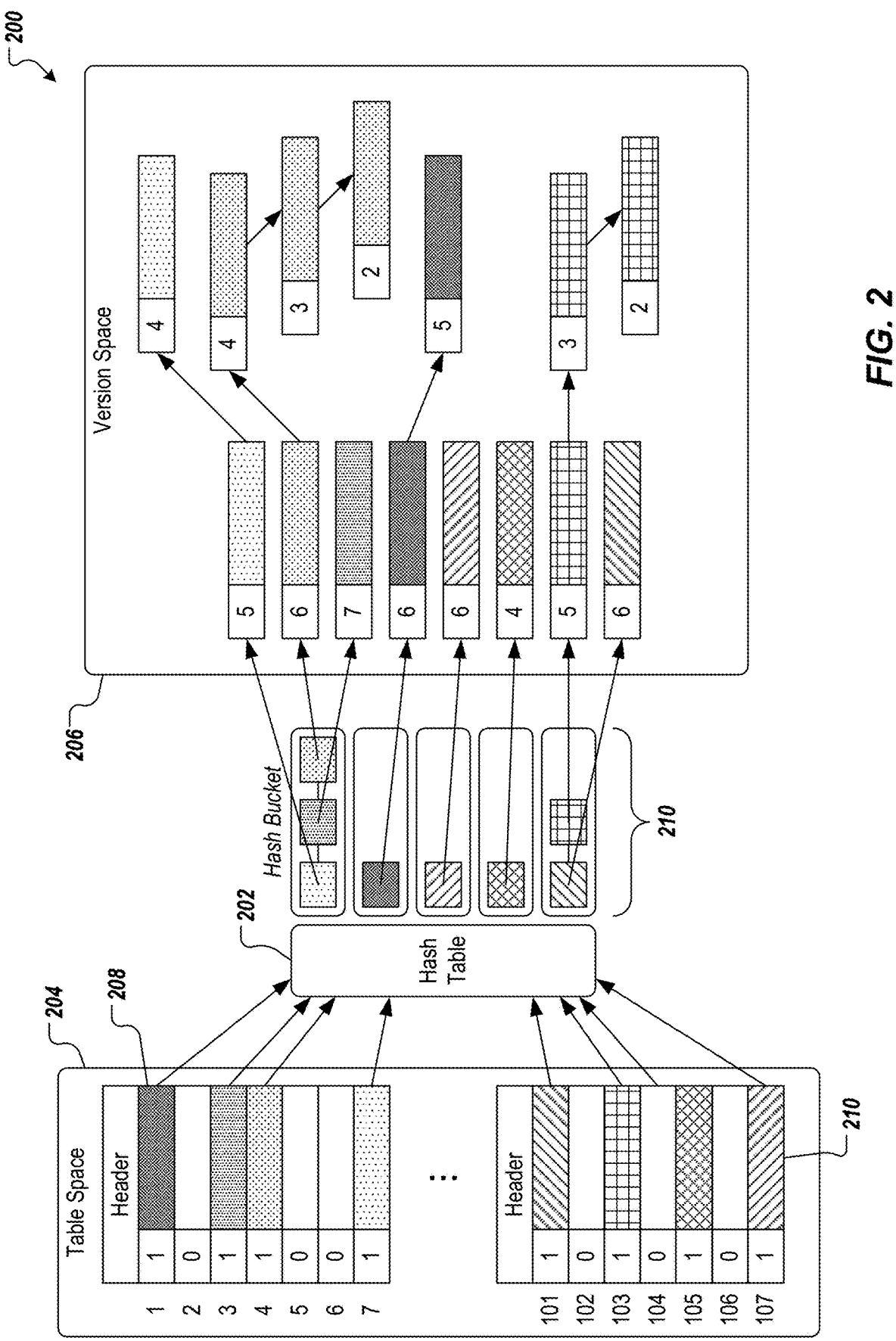
FIG. 2 depicts a graphical representation of an example version space scheme using a hash table.

FIG. 2 depicts a graphical representation of an example version space scheme 200 using a hash table 202. In the example of FIG. 2, a table space 204 stores data of one or more tables of a database system and a version space 206 stores versions (if any) of data stored in the table space 204. In the depicted example, the table space 204 stores records (data) in pages, such as pages 208, 210. In some examples, each page is associated with a segment, each segment having one or more pages. The records are stored within slots of pages. In the example of FIG. 2, records are stored within record locations (e.g., slots having respective record IDs) 1, 3, 4, 7 of the page 208 and within record locations (e.g., slots having respective record IDs) 101, 103, 105, 107 of the page 210. The hash table 202 includes a set of hash buckets 210.

However, version space schemes that use hash tables, such as that depicted in FIG. 2, have several drawbacks. For example, because of the potential for hash collisions, the search time of the hash table increases as the number of records having versions increases (i.e., as the number of entries in the hash table increases). Further, if a new entry is inserted or an existing entry is removed from the hash table, a mutually exclusive (mutex) is applied, which significantly degrades scalability. Also, the memory consumption (also referred to as memory footprint) of a hash table is relatively larger (even when there are few entries) as compared with other data structures (e.g., containers). This is because a relatively large array is pre-allocated for hash buckets. In database systems, the number of hash buckets is usually very large (e.g., larger than 1 million) to reduce hash collisions. Consequently, even the initial memory footprint is also very large.

In view of the above context, implementations of the present disclosure provide a version table that enables improved version space access, as compared to hash tables (or other complex data structures, such as containers). The version table of the present disclosure enables direct access from a table space to a version space.

In further detail, and as noted above, a page within a segment includes a set of slots, within which data (records) of a table can be stored. In accordance with implementations of the present disclosure, a version table is provided for a page and the page includes a pointer. In some examples, the pointer contains a memory address of an object (e.g., version table) that the pointer is pointing to. In some examples, prior to creation of a version table for the page, the pointer is provided as a null pointer. For example, the pointer contains a 0, indicating that the pointer does not point to any object. In some examples, after a version table is created for the page, the pointer is adjusted to point to the version table. In some examples, the version table is allocated in arbitrary heap memory and the version table pointer points to the memory address of the version table within the heap memory.

In some implementations, a version table for a page is not generated until at least one record within the page has a version created. As noted above, prior to generation of a version table, the pointer (also referred to herein as version table pointer) is a null pointer (i.e., does not point to anything). For example, at a first time (e.g., CTS=1), a page can be allocated to store data in a slot. At the first time, the version table pointer of the page is a null pointer. At a second time (e.g., CTS=2) a transaction is executed and committed, which results in a version of the data being provided in the version space. In response, a version table is created and the version table pointer is changed to point to the version table.

In accordance with implementations of the present disclosure, the version table includes a number of cells equal to the number of slots in the page. In some implementations, the order of cells in the version table corresponds to the order of slots in the page (e.g., the first cell of the version table corresponds to the first slot of the page, the second cell of the version table corresponds to the second slot of the page, etc.). In some examples, each cell of the version table includes a pointer (referred to herein as a version pointer). At creation of the version table, one or more cells corresponding to one or more versions that triggered creation of the version table, each include a version pointer that points to the respective version in the version space. In some examples, other cells that correspond to records of the page without versions in the version space include version pointers as null pointers.

Continuing with the example above, at the second time (e.g., CTS=2) the transaction is executed and committed, which results in the version of the data in the first slot (first record) being provided in the version space. In response, the version table is created and the version table pointer is changed to point to the version table. In this example, the version pointer of the first cell of the version table (i.e., the cell corresponding to the first slot) is set to point to the version of the data in the version space. In this example, all other version pointers are null pointers.

In some implementations, as other versions of the data are added, the version pointer is adjusted to point to the latest version of the data (i.e., the newest, most-recent version of the data). Further, a previous version pointer is added to the latest version of the data in the version space. The previous version pointer points to the version that was immediately preceding the latest version of the data.

Continuing with the example above, at a third time (e.g., CTS=3) a transaction is executed and committed, which results in another version (new version) of the data in the first slot (first record) being provided in the version space. In response, the version pointer of the first cell of the version table (i.e., the cell corresponding to the first slot) is changed to point to the new version of the data in the version space. Further, a previous version pointer is provided with the new version in the version space and points to the version immediately preceding the new version (i.e., in this example, the version provided as CTS=2). More particularly, the previous version pointer contains the memory address of the preceding version.

Figure 3:
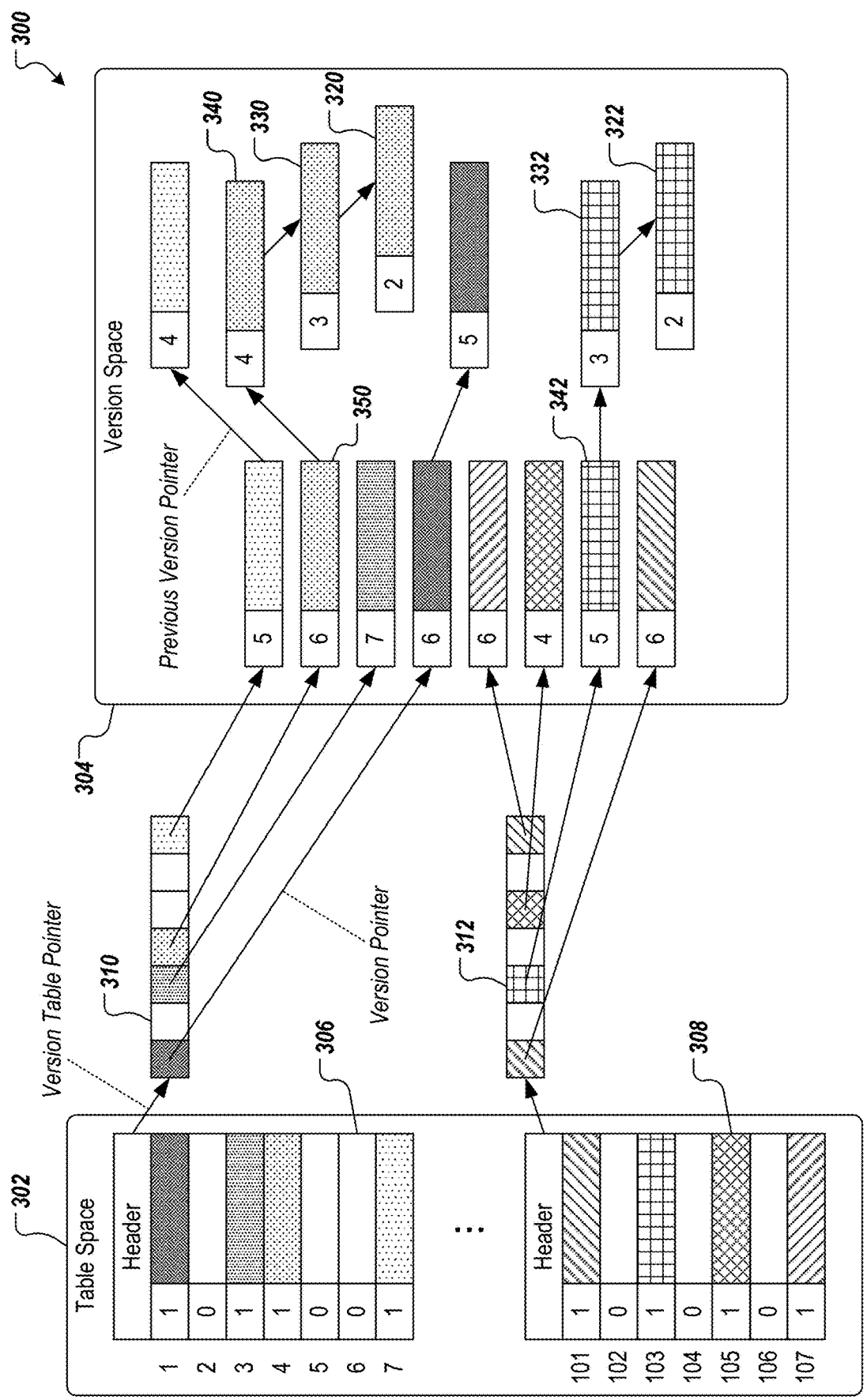
FIG. 3 depicts a graphical representation of an example version space scheme using version tables in accordance with implementations of the present disclosure.

FIG. 3 depicts a graphical representation of an example version space scheme 300 using version tables in accordance with implementations of the present disclosure. The example of FIG. 3 includes a table space 302 and a version space 304, the table space 302 including pages 306, 308, each of which stores records having respective versions. In accordance with implementations of the present disclosure, the pages 306, 308 are associated with respective version tables 310, 312. In some implementations, the version tables 310, 312 are absent prior to a version of a record being created.

By way of non-limiting example, there is no version table associated with either the page 306 or the page 308 at an initial CTS (e.g., CTS=1). For example, at the initial CTS, the table associated with the data stored in the page 306 and the table (same or different table) associated with the data stored in the page 308 are created. Data is stored in each of record IDs, 1, 3, 4, and 7 of the page 306 and in each of the record IDs 101, 103, 105, and 107 of the page 308. Subsequently, one or more transactions are executed and committed (e.g., at CTS=2), the transaction(s) resulting in another version of data already stored in the page 306 and the page 308. For example, the transaction(s) can change the data in record ID 4 of the page 306 and in record ID 103 of the page 308. In response, the version table 310 and the version table 312 are created and each includes a number of cells equal to the number of slots in the page 306, 308, respectively (e.g., 7, in the depicted example). A first version 320 corresponding to the record ID 7 and a first version 322 corresponding to the record ID 103 are stored in the version space 304.

Although not depicted in FIG. 3, at CTS=2, a first cell of the version table 310 includes a pointer to the first version 320 and a first cell of the version table 312 includes a pointer to the first version 322.

The example of FIG. 3 depicts a state of the version space 304 and the version tables 310, 312 at (or after) a later CTS (e.g., CTS=7). With particular reference to the record ID 4 of the page 306, versions 330, 340, 350 were added to the version space 304 and were committed at CTS=3, CTS=4, and CTS=6, respectively. With particular reference to the record ID 103 of the page 308, versions 332, 342 were added to the version space 304 and were committed at CTS=3, and CTS=5, respectively.

With each addition of a version, the pointer within the respective cell of the version tables 310, 312 (in this case, the first cell of the version table 310, which corresponds to record ID 1, and the third cell of the version table 312, which corresponds to the record ID 103) is adjusted to point to the newest version added to the version space 304. Also, a pointer is added to the newest version within the version space 304, which points to the immediately previous version. For example, in response to the version 350 being added to the version space 304, the pointer in the first cell of the version table 310 is adjusted to point to the version 350, and a pointer is added to the version 350 to point to the version 340.

In reading data from the table space and/or version space, it is determined whether a version flag of a data record is 0 or 1, where 1 indicates that the slot (record) has at least one version, and 0 indicates that the data in the table space is to be read. In the example of FIG. 3, the version flag is the value (0, 1) in each slot immediately preceding the data. If, for a particular slot, the version flag is 1, the version table is accessed and the pointer to the latest version of data is returned. If STS is larger than or equal to the CTS of the latest version, the data of the latest version is read from the version space. If STS is less than CTS of the latest version, the CTS of the next preceding versions is checked to determine whether the STS is larger than or equal to that CTS. This is repeated (comparing STS and CTS) until the readable data is returned. If, for some reason, nothing is readable in the version space, the data in the table space is read.

In some implementations, a version table can be deallocated when the last version of a page is garbage collected. For example, and with reference to FIG. 3, it can be assumed that there are only readers whose STS is equal to or larger than 7. The readers will always read the latest versions in this case. Therefore, older versions and data in the table space are no longer necessary. Consequently, garbage collection can be executed. During the garbage collection process, the data of the latest versions is copied to the records in the table space and all versions are deallocated. When the last version is deallocated the version table can also be deallocated. In this manner, the page contains the latest version of the data records and has no corresponding versions in the version space. If, however, another version is generated, the version table can again be generated and the process reiterate, as described herein.

As described herein, implementations of the present disclosure provide improved access (e.g., more rapid access) to versions of data in version spaces than traditional systems. For example, implementations of the present disclosure only use two indirections (pointer lookup) to access the version space. A first indirection is used to access the version table and a second indirection is to access the newest version within the version space. Further, implementations of the present disclosure improve processor efficiency, because there is no need to calculate complex hash functions and are free from hash collisions and any lock contentions that can arise from hash table management. In addition, implementations of the present disclosure are more efficient in terms of memory footprint. For example, from the perspective of initial memory footprint, there is no additional memory overhead, because version tables are not generated until versions are provided in the version space.

Figure 4:
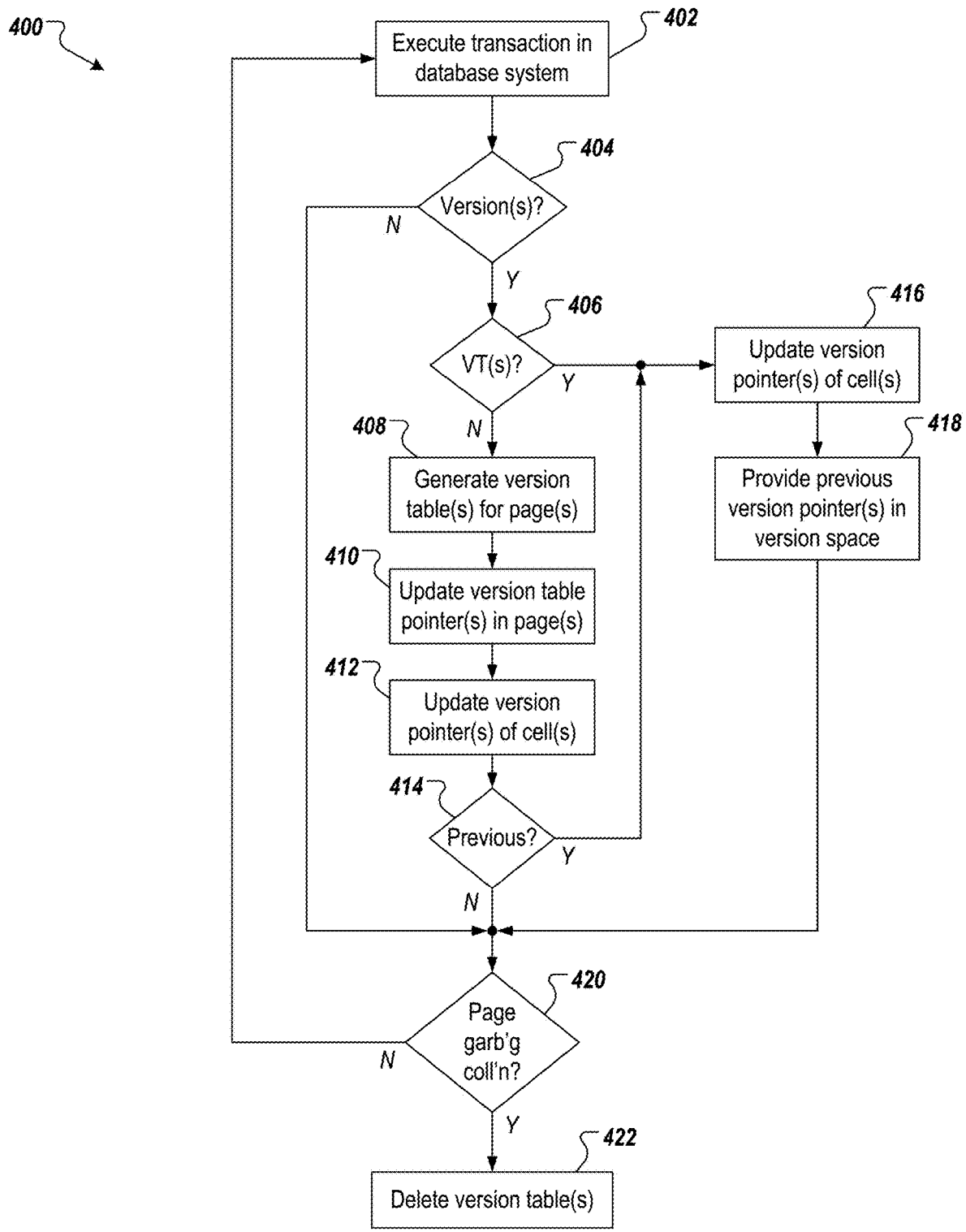
FIG. 4 depicts an example process that can be executed in accordance with implementations of the present disclosure.

FIG. 4 depicts an example process 400 that can be executed in accordance with implementations of the present disclosure. In some examples, the example process 400 is provided using one or more computer-executable programs executed by one or more computing devices. The example process of FIG. 4 presumes that a page has been allocated within a segment for storage of data therein, and there is at least one record populated with data. That is, for example, one or more transactions have been performed and data has been committed to a record location (slot) within the page (e.g., CREATE TABLE MYTAB (COL CHAR(10)); INSERT INTO MYTAB VALUES ('A'); COMMIT;).

A transaction is executed within the database system (402). For example, one or more clients (e.g., users, applications) interacting with the database system can submit queries to the database system, each query resulting in one or more transactions being performed on data stored within one or more pages. It is determined whether the transaction results in one or more versions of data (404). For example, it can be determined whether the transaction results in a change to data already stored in one or more pages. By way of non-limiting example and continuing with the examples above, an example transaction can include:

UPDATE MYTAB SET COL='B';
COMMIT;

The above example transaction would result in an update of A to B, where B is considered a version.

If the transaction results in one or more versions of data, it is determined whether a version table for the page(s) exists (406). That is, it is determined whether, for each page, the version is the first version for a record within the page. If the version table does not exist, one or more version tables are generated for the one or more pages (408). For example, and as described herein, the version table includes a number of cells equal to the number of slots in the page. In some implementations, the order of cells in the version table corresponds to the order of slots in the page (e.g., the first cell of the version table corresponds to the first slot of the page, the second cell of the version table corresponds to the second slot of the page, etc.). In some examples, each cell of the version table includes a pointer (referred to herein as a version pointer). At creation of the version table, one or more cells corresponding to one or more versions that triggered creation of the version table, each include a version pointer that points to the respective version in the version space. In some examples, other cells that correspond to records of the page without versions in the version space include version pointers as null pointers. Each page is associated with only one version table.

The version table pointer of each of the one or more pages is updated (410). For example, and as described herein, prior to a version table being generated for a page, the version table pointer of the page is a null pointer. After creation of the version table for the page, the version table pointer of the page is updated to point to the version table. One or more version pointers of one or more cells in the version table are updated (412). For example, and as described herein, at generation of the version table, each cell in the version table includes a version pointer initially provided as a null pointer. At least one version pointer is updated to point to a version of data within the version space. Continuing with the example above, in response to the update of A to B, a version table is generated for the page, in which A is stored, a version table pointer of the page is updated from a null pointer to point to the version table, and a version pointer in a cell of the version table is updated from a null pointer to point to B in the version space.

It is determined whether any of the versions is an update to a previous version (414). For example, it can occur that one or more transactions result in a new version for a page, triggering generation of the version table, as described above, and also result in a previous version being updated in another page. That is, an update to a version for a page that already has a version table (i.e., already has data stored therein with respective versions).

If the version table does not exist (as decided at (406)) or a version is an update to a previous version (as decided at (414)), one or more version pointer(s) of one or more cell(s) within a version table are updated (416). For example, the latest version of the data is stored in the version space and the version pointer of the respective cell in the version table is updated to point to the latest version. One or more previous version pointers are provided in the version space (418). For example, a previous version pointer is provided with the latest version to point to an immediately previous version.

Continuing with the example above, a transaction can result in an update to a version already provided in the version space. For example, the following example transaction can be performed:

UPDATE MYTAB SET COL='C';
COMMIT;

This results in B being updated to C. In this example, C is considered the latest (most-recent) version, and B is considered the immediately previous version. In this example, a version pointer in the version table is updated to point to C, instead of B, and a previous version pointer is associated with C, the previous version pointer pointing to B.

If the transaction does not result in one or more versions of data (as decided at (404)), or a version is not an update to a previous version (as decided at (414)), it is determined whether a version garbage collection process is to be performed (420). If there is not a version garbage collection process, the example process 400 loops back. If there is a version garbage collection process, any version table associated with versions deleted from the version space is deleted (422).

Figure 5:
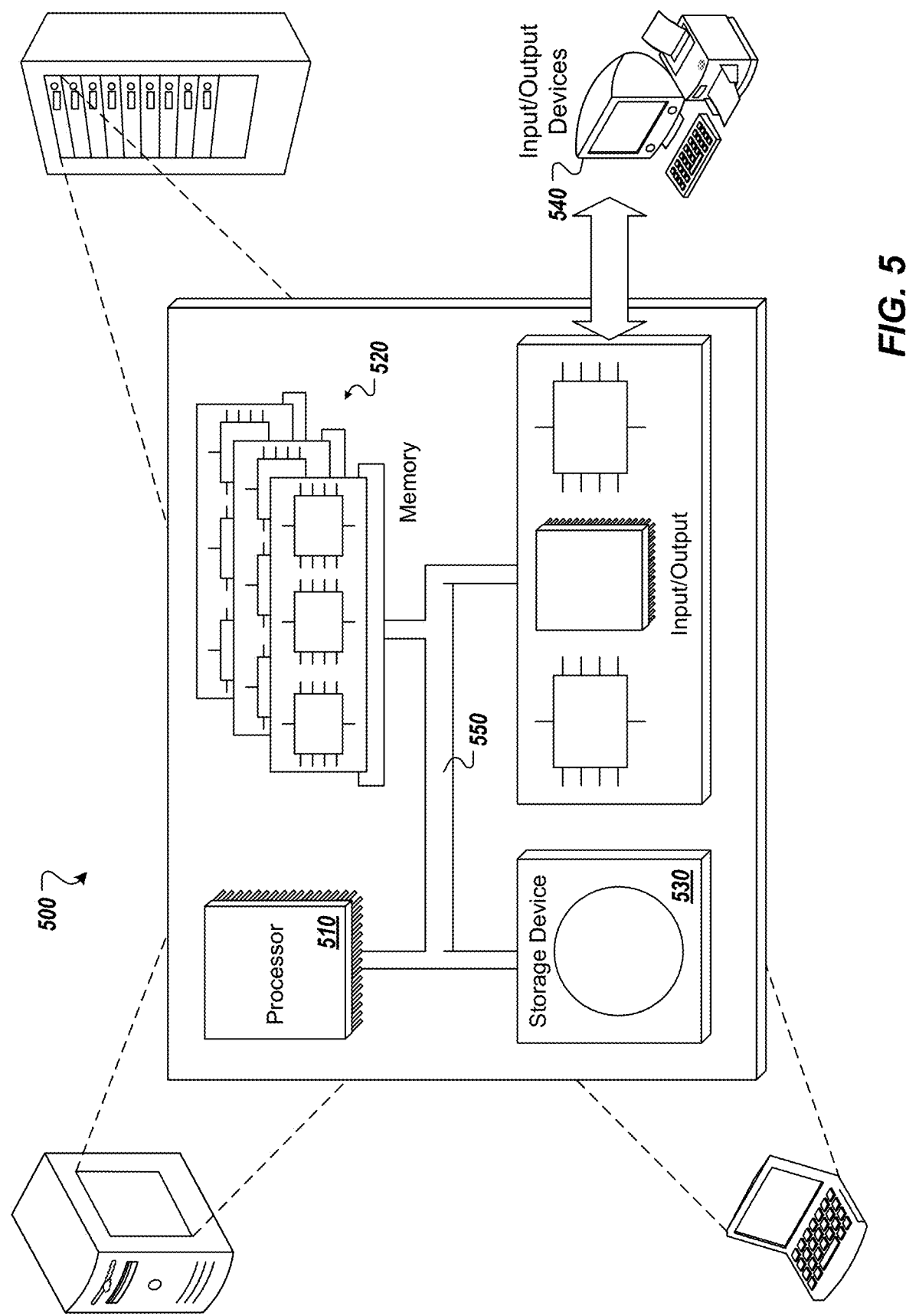
FIG. 5 is a schematic illustration of example computer systems that can be used to execute implementations of the present disclosure.

Referring now to FIG. 5, a schematic diagram of an example computing system 500 is provided. The system 500 can be used for the operations described in association with the implementations described herein. For example, the system 500 may be included in any or all of the server components discussed herein. The system 500 includes a processor 510, a memory 520, a storage device 530, and an input/output device 540. The components 510, 520, 530, 540 are interconnected using a system bus 550. The processor 510 is capable of processing instructions for execution within the system 500. In some implementations, the processor 510 is a single-threaded processor. In some implementations, the processor 510 is a multi-threaded processor. The processor 510 is capable of processing instructions stored in the memory 520 or on the storage device 530 to display graphical information for a user interface on the input/output device 540.

The memory 520 stores information within the system 500. In some implementations, the memory 520 is a computer-readable medium. In some implementations, the memory 520 is a volatile memory unit. In some implementations, the memory 520 is a non-volatile memory unit. The storage device 530 is capable of providing mass storage for the system 500. In some implementations, the storage device 530 is a computer-readable medium. In some implementations, the storage device 530 may be a floppy disk device, a hard disk device, an optical disk device, or a tape device. The input/output device 540 provides input/output operations for the system 500. In some implementations, the input/output device 540 includes a keyboard and/or pointing device. In some implementations, the input/output device 540 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier (e.g., in a machine-readable storage device, for execution by a programmable processor), and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer can include a processor for executing instructions and one or more memories for storing instructions and data. Generally, a computer can also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, for example, a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method for providing access to a version space in database systems, the method being executed by one or more processors and comprising:
   determining that a first transaction results in a first version of data stored in a page in a database system, the first version being stored in a version space and the data being stored in a table space;
   in response to the first version, providing a version table for the page, the version table being exclusive to the page and allocated outside of the version space in heap memory, and comprising a set of cells, each cell corresponding to a record in the page and having a respective version pointer initially set to null;
   setting a version table pointer of the page to point from a respective table within the table space to the version table, the version table pointer containing a memory address of the version table within the heap memory; and
   setting a first version pointer of a first cell from null to point to the first version in the version space, the first cell corresponding to a record of the data in the page.

2. The method of claim 1, wherein, prior to determining that a transaction results in a first version of data stored in a page, the version table pointer comprises a null pointer.

3. The method of claim 1, wherein a second version pointer of a second cell in the set of cells comprises a null pointer.

4. The method of claim 1, further comprising:
   determining that a second transaction results in a second version of the data stored in the page, the second version being stored in the version space, and in response to the second version:
   changing the first version pointer of the first cell to point to the second version in the version space, and
   providing a previous version pointer of the second version to point to the first version within the version space.

5. The method of claim 1, wherein a number of cells in the set of cells is equal to a number of records in the page.

6. The method of claim 1, further comprising deleting the version table in response to execution of a version garbage collection process.

7. The method of claim 1, further comprising:
   receiving a read request for a record in the page, the read request comprising a snapshot timestamp; and
   determining that a version flag of the record is set to a value indicating that at least one version of data of the record is stored in the version space, and in response, accessing a version of the data based on the STS and one or more commit timestamps (CTSs).

8. A non-transitory computer-readable storage medium coupled to one or more processors and having instructions stored thereon which, when executed by the one or more processors, cause the one or more processors to perform operations for providing access to a version space in database systems, the operations comprising:
   determining that a first transaction results in a first version of data stored in a page in a database system, the first version being stored in a version space and the data being stored in a table space;
   in response to the first version, providing a version table for the page, the version table being exclusive to the page and allocated outside of the version space in heap memory, and comprising a set of cells, each cell corresponding to a record in the page and having a respective version pointer initially set to null;
   setting a version table pointer of the page to point from a respective table within the table space to the version table, the version table pointer containing a memory address of the version table within the heap memory; and
   setting a first version pointer of a first cell from null to point to the first version in the version space, the first cell corresponding to a record of the data in the page.

9. The computer-readable storage medium of claim 8, wherein, prior to determining that a transaction results in a first version of data stored in a page, the version table pointer comprises a null pointer.

10. The computer-readable storage medium of claim 8, wherein a second version pointer of a second cell in the set of cells comprises a null pointer.

11. The computer-readable storage medium of claim 8, wherein operations further comprise:
   determining that a second transaction results in a second version of the data stored in the page, the second version being stored in the version space, and in response to the second version:
   changing the first version pointer of the first cell to point to the second version in the version space, and
   providing a previous version pointer of the second version to point to the first version within the version space.

12. The computer-readable storage medium of claim 8, wherein a number of cells in the set of cells is equal to a number of records in the page.

13. The computer-readable storage medium of claim 8, wherein operations further comprise deleting the version table in response to execution of a version garbage collection process.

14. The computer-readable storage medium of claim 8, wherein operations further comprise:
   receiving a read request for a record in the page, the read request comprising a snapshot timestamp; and
   determining that a version flag of the record is set to a value indicating that at least one version of data of the record is stored in the version space, and in response, accessing a version of the data based on the STS and one or more commit timestamps (CTSs).

15. A system, comprising:
   a computing device; and
   a computer-readable storage device coupled to the computing device and having instructions stored thereon which, when executed by the computing device, cause the computing device to perform operations for providing access to a version space in database systems, the operations comprising:
   determining that a first transaction results in a first version of data stored in a page in a database system, the first version being stored in a version space and the data being stored in a table space;
   in response to the first version, providing a version table for the page, the version table being exclusive to the page and allocated outside of the version space in heap memory, and comprising a set of cells, each cell corresponding to a record in the page and having a respective version pointer initially set to null;
   setting a version table pointer of the page to point from a respective table within the table space to the version table, the version table pointer containing a memory address of the version table within the heap memory; and
   setting a first version pointer of a first cell from null to point to the first version in the version space, the first cell corresponding to a record of the data in the page.

16. The system of claim 15, wherein, prior to determining that a transaction results in a first version of data stored in a page, the version table pointer comprises a null pointer.

17. The system of claim 15, wherein a first version pointer of a second cell in the set of cells comprises a null pointer.

18. The system of claim 15, wherein operations further comprise:
   determining that a second transaction results in a second version of the data stored in the page, the second version being stored in the version space, and in response to the second version:
   changing the first version pointer of the first cell to point to the second version in the version space, and
   providing a previous version pointer of the second version to point to the first version within the version space.

19. The system of claim 15, wherein a number of cells in the set of cells is equal to a number of records in the page.

20. The system of claim 15, wherein operations further comprise deleting the version table in response to execution of a version garbage collection process.

* * * * *